US011905902B2

(12) United States Patent
Hofmair et al.

(10) Patent No.: US 11,905,902 B2
(45) Date of Patent: Feb. 20, 2024

(54) METHOD FOR MANAGING START UP OF A FOUR-STROKE ENGINE

(71) Applicant: BRP-ROTAX GMBH & CO. KG, Gunskirchen (AT)

(72) Inventors: Matthias Hofmair, Buchkirchen (AT); Richard Winkoff, Mistelbach bei Wels (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/159,175

(22) Filed: Jan. 25, 2023

(65) Prior Publication Data

US 2023/0243317 A1 Aug. 3, 2023

Related U.S. Application Data

(60) Provisional application No. 63/304,784, filed on Jan. 31, 2022.

(51) Int. Cl.
*F02D 41/06* (2006.01)
*F02B 75/02* (2006.01)
(Continued)

(52) U.S. Cl.
CPC ............ *F02D 41/062* (2013.01); *F02B 75/02* (2013.01); *F02D 41/0097* (2013.01);
(Continued)

(58) Field of Classification Search
CPC ............... F02D 41/062; F02D 41/0097; F02D 2200/101; F02B 75/02; F02B 2075/027; F02P 5/1506
See application file for complete search history.

(56) References Cited

U.S. PATENT DOCUMENTS 5,758,625 A 6/1998 Ponti
6,340,020 B2 * 1/2002 Yamazaki ............ F02D 41/009 123/480

(Continued)

FOREIGN PATENT DOCUMENTS

DE 102011083471 A1 3/2013
EP 0262166 B1 6/1992

(Continued)

OTHER PUBLICATIONS

Extended European Search Report issued from the EPO dated Jul. 10, 2023 in connection with the corresponding Application No. 23153349.8; Michael Boye.

*Primary Examiner* — Sizo B Vilakazi
(74) *Attorney, Agent, or Firm* — BCF LLP

(57) ABSTRACT

A method for managing start up of a four-stroke engine, the method being performed by a controller communicatively connected to the engine. The method includes determining, using a crankshaft sensor, an angular orientation of the crankshaft, the crankshaft being rotated by a starter motor prior to ignition of the engine; determining, using the crankshaft sensor, at least one engine speed variation as the crankshaft rotates through at least one measurement window; and identifying a working cycle phase of the crankshaft including in response to an absolute value of the at least one engine speed variation being above a threshold, determining that the crankshaft is in an ignition revolution of a two revolution working cycle of the engine in the measurement window, subsequent ignition of the engine being based on determination of the angular orientation and the working cycle phase of the crankshaft.

10 Claims, 5 Drawing Sheets

(51) Int. Cl.
*F02D 41/00* (2006.01)
*F02P 5/15* (2006.01)

(52) U.S. Cl.
CPC ....... *F02P 5/1506* (2013.01); *F02B 2075/027* (2013.01); *F02D 2200/101* (2013.01)

(56) References Cited

U.S. PATENT DOCUMENTS

| | | | | |
|---|---|---|---|---|
| 6,968,269 | B2 * | 11/2005 | Yamashita | F02D 41/009 701/114 |
| 2004/0255902 | A1 * | 12/2004 | Sawada | F02D 41/086 123/339.11 |
| 2007/0235009 | A1 * | 10/2007 | Nakashima | F02D 41/047 123/458 |
| 2019/0257261 | A1 | 8/2019 | Surnilla et al. | |

FOREIGN PATENT DOCUMENTS

| | | | |
|---|---|---|---|
| EP | 576334 | A1 | 12/1993 |
| EP | 640762 | A1 | 3/1995 |
| EP | 990784 | A2 | 4/2000 |
| EP | 2375042 | A1 | 10/2011 |
| GB | 2337123 | A | 11/1999 |

* cited by examiner

METHOD FOR MANAGING START UP OF A FOUR-STROKE ENGINE

CROSS-REFERENCE

The present application claims priority to U.S. Provisional Patent Application No. 63/304,784, entitled "Method for Managing Start Up of a Four-Stroke Engine," filed Jan. 31, 2022, the entirety of which is incorporated by reference herein.

FIELD OF TECHNOLOGY

The present disclosure describes a method for managing start up of a four-stroke engine in a recreational vehicle.

BACKGROUND

When starting an engine in a vehicle, the positioning of the pistons in their corresponding cylinders needs to be known in order to properly time ignition. In two-stroke engines, the piston positions can be determined from the rotational position of the crankshaft of the engine. In four-stroke engines, however, the crankshaft rotates twice through each working cycle. Additional information is thus needed to identify the crankshaft phase, i.e. if the crankshaft is in a first or second revolution of the working cycle. This information is often provided by a camshaft sensor sensing the rotational position of the camshaft, which rotates once per working cycle. The combined information from the crankshaft sensor and the camshaft sensor can then provide the full information needed to properly time ignition and injection but requires two sensors.

While automobiles are often programmed to retain the relative orientation and position of the crankshaft when the engine is shut down, the computational devices in recreational vehicles are not often programmed in such a way. Further, if a recreational vehicle is moved while not operating, the crankshaft could move from the last known position without being tracked by the vehicle electronics.

There is thus a desire for methods for determining crankshaft positioning within a working cycle during engine start up.

SUMMARY

It is an object of the present technology to ameliorate at least some of the inconveniences present in the prior art.

In one aspect, the present technology provides a method for managing starting a four-stroke engine of a recreational vehicle. More specifically, a method is presented for determining rotational position and the phase information for the crankshaft in a four-stroke engine using only the crankshaft sensor. This permits a camshaft sensor to be omitted. In the present method, the rotational speed of the crankshaft, as it is rotated by the starter motor prior to ignition, is tested in one or more measurement windows. During the air intake/exhaust phase of the two revolution working cycle, valves of the engine are open and each piston moves freely in the corresponding cylinder. During the compression/ignition revolution of the cycle, however, each piston encounters pressure in the cylinder due to the valves being closed. During the compression stroke, air in the cylinder is compressed, causing the piston and the crankshaft to slow. As the piston moves to the expansion stroke, the pressure of the compressed air accelerates the piston, thereby increasing the rotational speed of the crankshaft. The present method thus allows for identification of the revolution or phase of the working cycle based on speed variation caused by air compression in the cylinder. Identification of the phase of the working cycle could be used to properly time ignition and/or injection for engine operation.

According to an aspect of the present technology, there is provided a method for managing start up of a four-stroke engine, the method being performed by a controller communicatively connected to the engine. The method includes determining, using a crankshaft sensor communicatively connected to the controller, an angular orientation of the crankshaft, the crankshaft being rotated by a starter motor operatively connected to the crankshaft prior to ignition of the engine; determining, using the crankshaft sensor, at least one engine speed variation as the crankshaft rotates through at least one measurement window; and identifying a working cycle phase of the crankshaft including in response to an absolute value of the at least one engine speed variation being above a threshold, determining that the crankshaft is in an ignition revolution of a two revolution working cycle of the engine in the at least one measurement window, subsequent ignition of the engine being based on determination of the angular orientation of the crankshaft and identification of the working cycle phase of the crankshaft.

In some implementations, determining the angular orientation of the crankshaft includes detecting, using the crankshaft sensor, a tooth gap in a plurality of regularly spaced teeth of a gear connected to and rotationally fixed on the crankshaft; and identifying the angular orientation based on a priori knowledge of placement of the tooth gap relative to the angular orientation of the crankshaft.

In some implementations, determining the at least one engine speed variation includes determining at least one first rotational speed indication of the crankshaft as the crankshaft rotates through a first portion of the at least one measurement window; determining at least one second rotation speed indication of the crankshaft as the crankshaft rotates through a second portion of the at least one measurement window; and calculating a difference of the at least one first rotation speed indication and the at least one second rotation speed indication.

In some implementations, determining the at least one first rotational speed indication includes sensing, by the crankshaft sensor, passage of a first given tooth (n) through the crankshaft sensor, the first given tooth (n) being one of a plurality of regularly spaced teeth of a gear connected to and rotationally fixed on the crankshaft, sensing, by the crankshaft sensor, passage of a first subsequent tooth (n+1) disposed immediately adjacent to the first given tooth (n) through the crankshaft sensor, and determining a first tooth time between passage of the first given tooth (n) and passage of the first subsequent tooth (n+1); and determining the at least one second rotational speed indication includes sensing, by the crankshaft sensor, passage of a second given tooth (m) through the crankshaft sensor, sensing, by the crankshaft sensor, passage of a second subsequent tooth (m+1) disposed immediately adjacent to the second given tooth (m) through the crankshaft sensor, and determining a second tooth time between passage of the second given tooth (m) and passage of the second subsequent tooth (m+1).

In some implementations, determining the first tooth time comprises selecting the first given tooth (n) and the first subsequent tooth (n+1) as the crankshaft approaches a selected angular position in the first portion of the at least one measurement window; and determining the second tooth time comprises selecting the second given tooth (m) and the second subsequent tooth (m+1) as the crankshaft rotates away from the selected angular position in the second portion of the at least one measurement window.

In some implementations, the method further includes causing ignition in at least one cylinder of the engine during subsequent rotations of the crankshaft; and timing of the causing the ignition is based on: determination of the angular orientation of the crankshaft, and determination that the crankshaft is in one of the first revolution and the second revolution.

In some implementations, the method further includes, prior to determining the angular orientation of the crankshaft, causing the starter motor to rotate the crankshaft.

In some implementations, determining the at least one engine speed variation includes identifying the at least one measurement window based at least in part on determination of the angular orientation of the crankshaft.

In some implementations, the method further includes, prior to determining the at least one engine speed variation, retrieving an angular range of the crankshaft describing the at least one measurement window, the angular range being based at least in part on an expected top dead center position for at least one piston operatively connected to the crankshaft.

In some implementations, the at least one engine speed variation is at least one first speed variation; and identifying the working cycle phase further includes, in response to an absolute value of the at least one first speed variation being below the threshold: determining, after the crankshaft has rotated 360 degrees, at least one second speed variation as the crankshaft rotates through the at least one measurement window, and in response to the at least one second speed variation being above the threshold, determining that the crankshaft is in the ignition revolution of the two revolution working cycle.

In some implementations, the at least one measurement window is a first measurement window; and identifying the working cycle phase further includes, in response to an absolute value of the at least one second speed variation being below the threshold: determining at least one third speed variation as the crankshaft rotates through a second measurement window, and in response to an absolute value of the at least one third speed variation being above the threshold, determining that the crankshaft is in the ignition revolution of the two revolution working cycle.

In some embodiments, the threshold is a first threshold; and the method further includes, in response to an absolute value of the at least one engine speed variation being below a second threshold, determining that the crankshaft is in an air exchange revolution of the two revolution working cycle of the engine in the at least one measurement window.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described generally with respect to an inline three-cylinder, four-stroke internal combustion engine for a recreational vehicle. However, it is contemplated that some aspects of the present technology may apply to other types of four-stroke internal combustion engine such as, but not limited to, one-cylinder engines, two cylinder inline engines, and v-twin engines. The recreational vehicle implementing the present technology could be selected from a variety of recreational vehicle types, including but not limited to, snowmobiles, side-by-side vehicles (SSVs), all-terrain vehicles (ATVs), and personal watercraft.

Figure 1:
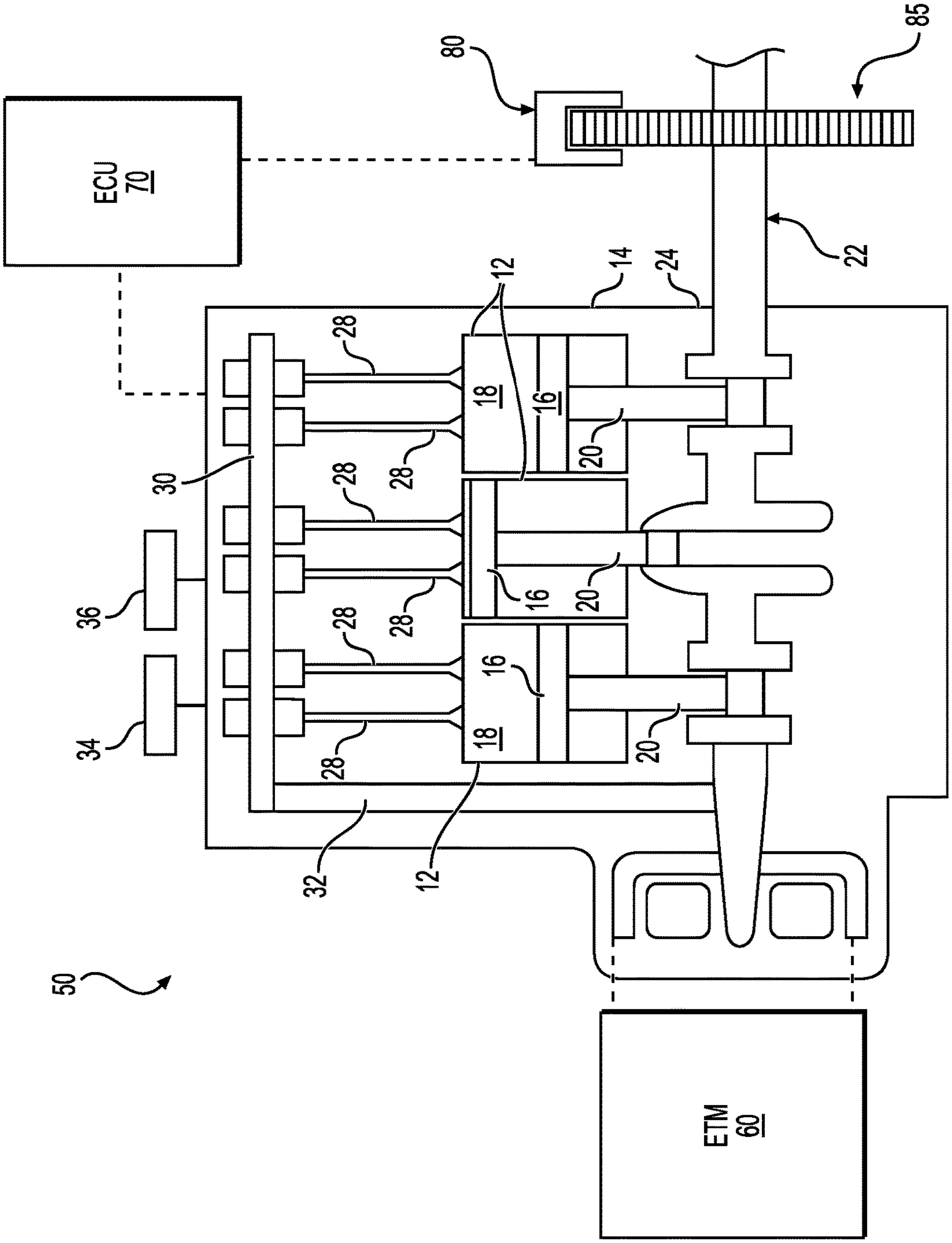
FIG. 1 is a schematic depiction of a three-cylinder four-stroke engine for a recreational vehicle in accordance with an implementation of the present technology.

With reference to FIG. 1, general features of an engine 50 for a recreational vehicle will be described. The engine 50 in the present embodiment is a four-stroke inline three-cylinder engine having three cylinders 12 and an evenly distributed firing sequence. The cylinders 12 are contained in a cylinder block 14. Each cylinder 12 has a piston 16 disposed therein. Each piston 16 can reciprocate within its respective cylinder 12 to change the volume of a combustion chamber 18 associated with the cylinder 12. Each piston 16 is coupled via a connecting rod 20 to a crankshaft 22 received in a crankcase 24.

A plurality of valves 28 are provided in the cylinder head (not separately identified) for each cylinder 12. Some of the valves 28, referred to as intake valves, allow air and fuel to enter the combustion chambers 18 for combustion therein. It is contemplated that in alternative embodiments, fuel could be injected directly into the combustion chambers 18 during the compression stroke, in which case these valves 28 only allow air to flow into the combustion chambers 18. Other ones of the valves 28, referred to as exhaust valves, allow exhaust gases to exit the combustion chambers 18 after combustion has occurred. The opening and closing of the valves 28 are controlled by a camshaft 30, which is driven by the crankshaft 22 via a chain 32.

The engine 50 is communicatively connected to an engine control unit (ECU) 70 for managing operations of the engine 50. Depending on the vehicle implementing the engine 50 and the ECU 70, it is contemplated that the ECU 70 could be connected to a variety of sensors and electronic components to aid in managing the engine 50 and/or other vehicle operations. In at least some embodiments, it is contemplated that the ECU 70 could be communicatively connected to a memory device for storing information and/or instructions therein. Operations of the ECU 70 for managing start up of the engine 50 will be described in more detail below.

The engine 50 includes a fuel injection system 34 (schematically shown) controlled by the ECU 70 to inject fuel to be delivered to the combustion chambers 18 upstream of the intake valves 28. In the present embodiment, the fuel injection system 34 is a multi-port fuel injection (MPFI) system 34, but other types of systems are contemplated. The engine 50 also includes an ignition system 36 (schematically shown) controlled by the ECU 70 to ignite the air-fuel mixture inside the combustion chambers 18.

The engine 50 is also operatively connected to a starter motor 60, also referred to as an electric turning machine (ETM). The starter motor 60 is generally used for starting the engine 50. In the present implementation, upon the ECU 70 receiving a signal that a start up of the engine 50 is desired, the starter motor 60 rotates the crankshaft 22 prior to a first combustion ignition of the engine 50. To initially rotate the crankshaft 22, power from a battery (not shown) is supplied to the starter motor 60.

Figure 2:
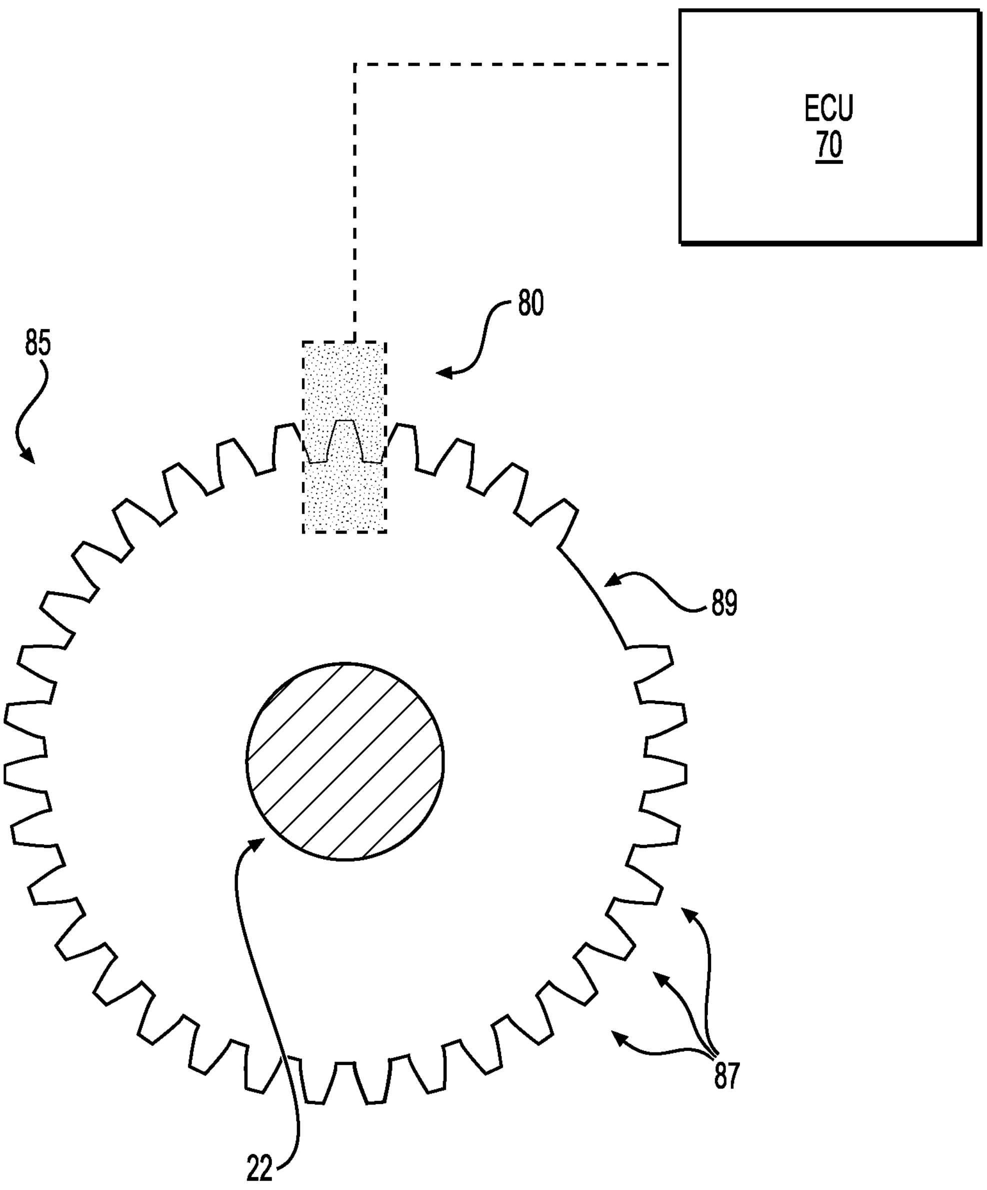
FIG. 2 is a schematic depiction of a toothed wheel, a crankshaft, engine control unit, and a crankshaft sensor of the engine of FIG. 1.

With additional reference to FIG. 2, the engine 50 further includes a crankshaft sensor 80 and a toothed gear 85 for determining an angular position and a working cycle phase of the crankshaft 22 (described in greater detail below). The toothed gear 85 is connected to and rotationally fixed on crankshaft 22, such that the toothed gear 85 rotates with the crankshaft 22. The toothed gear 85 includes a plurality of regularly spaced teeth 87 arranged around an exterior edge of the gear 85. In the present implementation, the gear 85 specifically includes thirty-four (34) teeth. The teeth 87 are distributed in a regular spacing for thirty-six teeth (i.e. a first edge of one tooth 87 at each 10 degrees), with two teeth being omitted to form a tooth gap 89. The tooth gap 89 in the present implementation spans approximately 20 degrees of the circumference of the gear 85. It is contemplated that the tooth gap 89 could be angularly wider or narrower in different implementations.

The crankshaft sensor 80 is positioned around the rotating edge of the gear 85 such that the sensor 80 is arranged to detect each tooth 87 of the gear 85 as it rotates therethrough. While illustrated as being disposed over a top side of the gear 85, the specific placement around the circumference of the gear 85 is not so limited. The crankshaft sensor 80 is communicatively connected to the ECU 70 for communicating information related to detection of the teeth 87 thereto.

By the present technology, methods for managing start up of the four-stroke engine 50 are presented. When a signal is received to start the engine 50, the crankshaft 22 is first rotated by the starter motor 60. Once the crankshaft 22 has achieved some minimum rotation speed, ignition, by the ignition system 36, of the combustion cycle in the engine 50 is initiated by the ECU 70 to drive the engine 50. In order to properly time the ignition, the ECU 70 needs to identify when each piston 16 is in its compression stroke.

In a four-stroke engine, such as the engine 50, the crankshaft 22 turns twice (720 degrees) for each working cycle. In one revolution of the two revolution working cycle of the engine 50, also referred to herein as the working cycle phase, the piston 16 moves through an exhaust stroke and an air inlet stroke where air in the cylinder 12 is exchanged. In the other revolution of two revolution working cycle the piston 16 moves through a compression stroke and an expansion stroke, ignition being caused between the compression and expansion strokes. It is therefore necessary to know not only the angular position of the crankshaft 22, but also which revolution of the working cycle the crankshaft 22 is in.

For at least these reasons, a procedure for determining the angular orientation and the working cycle phase of the crankshaft 22 is described. By the present technology, a method is described using the crankshaft sensor 80 to determine both the angular orientation and the working cycle phase.

Figure 3:
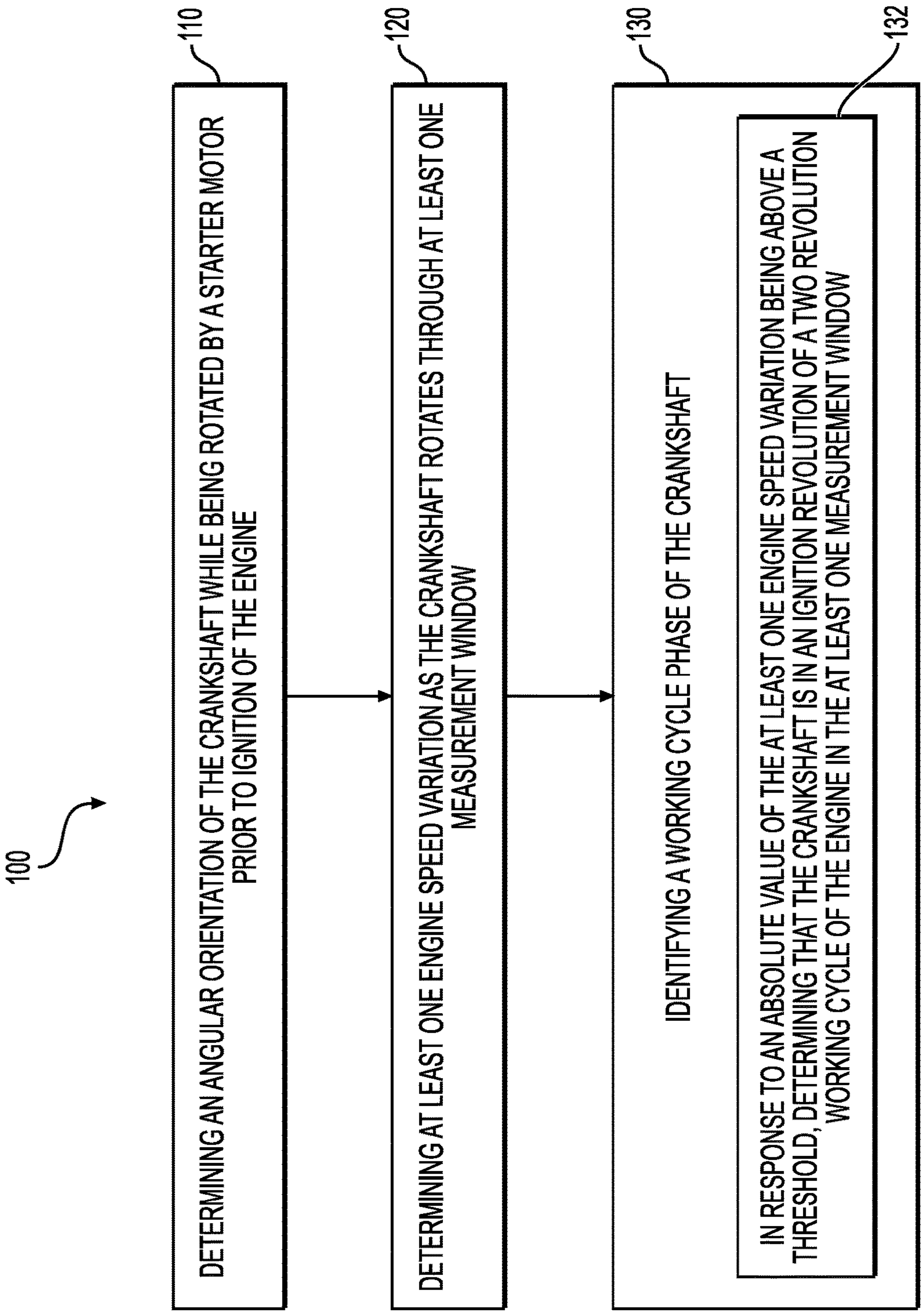
FIG. 3 is a flowchart illustrating a method for managing start up of the engine of FIG. 1.

With reference to FIG. 3, a method 100 for managing start up of the four-stroke engine 50 according to non-limiting implementations of the present technology is schematically illustrated. The method 100 is performed by a controller communicatively connected to the engine 50. In the present implementation, the method 100 is specifically performed by the ECU 70, although different computer implemented devices could be used in some cases.

The method 100 generally begins once the starter motor 60 has been caused to rotate the crankshaft 22. In some cases, causing the starter motor 60 to begin rotation of the crankshaft 22 is a first step in the method 100. In some cases, it is contemplated that a different mechanism or component could initiate the starter motor 60.

The method 100 begins, at step 110, with determining, using the crankshaft sensor 80, an angular orientation of the crankshaft 22. As the crankshaft 22 is rotating during implementation of the method 100, it is noted that determining the angular orientation of the crankshaft 22 could generally include determining an instantaneous angular positioning of the crankshaft 22, as well as subsequently tracking the angular orientation based on the engine speed.

In at least some implementations, determining the angular orientation includes detecting the tooth gap 89 using the crankshaft sensor 80. The ECU 70 then identifies the angular orientation of the crankshaft 22 based on a priori knowledge of placement of the tooth gap 89 relative to the angular orientation of the crankshaft 22. Based on the angular orientation information, the ECU 70 can subsequently identify timing of the strokes of each piston 16. The information relating placement of the tooth gap 89 relative to the angular orientation and the relative disposition of the pistons 16 to the angular orientation is generally stored to the ECU 70. It is contemplated that the information could be stored in a memory device communicatively connected to the ECU 70 in some implementations.

The method 100 continues, at step 120, with determining, using the crankshaft sensor 80, at least one engine speed variation as the crankshaft 22 rotates through at least one measurement window.

Broadly, the present technology takes advantage of speed variations in the crankshaft 22 caused by variations in air pressure in the combustion chambers 18 of the engine 50 during rotation of the crankshaft 22 by the starter motor 60. When the crankshaft 22 rotates through the air exchange phase of the two revolution working cycle, i.e. when the piston 16 moves through the exhaust and air inlet strokes, the piston 16 moves freely through the cylinder 12 and air passes in and out of the valves 28 which are open during the air exchange phase. When the crankshaft 22 is in the ignition phase, where the piston 16 moves through the compression and expansion strokes, however, the valves 28 are closed. Air in the cylinder 12 is thus contained therein, with the piston 16 compressing air in the cylinder 12 during the compression stroke. Compression of the air causes the crankshaft 22 to slightly slow its rotation. Conversely, as the piston 16 moves through the expansion stroke, the pressurized air exerts a force on the piston 16, causing the crankshaft 22 to rotate slightly faster. The ignition phase of the working cycle can thus be identified by detecting a variation in rotational speed of the crankshaft 22.

In the present non-limiting implementation, it is noted the rotational speed of the crankshaft 22 is generally represented by a unit referred to as tooth time (t). Tooth time is the time of arrival of a given tooth 87 (at the crankshaft sensor 80) following the arrival of an immediately previous and adjacent tooth 87, i.e. the time elapsed between two teeth 87. Increasing tooth time thus represents a decreasing rotational speed of the crankshaft 22 and decreasing tooth time represents an increasing rotational speed of the crankshaft 22. Depending on the specific implementation, it is contemplated that a different unit or measurement regime could be utilized for identifying increases or decreases in rotational speed of the crankshaft 22.

Figure 4:
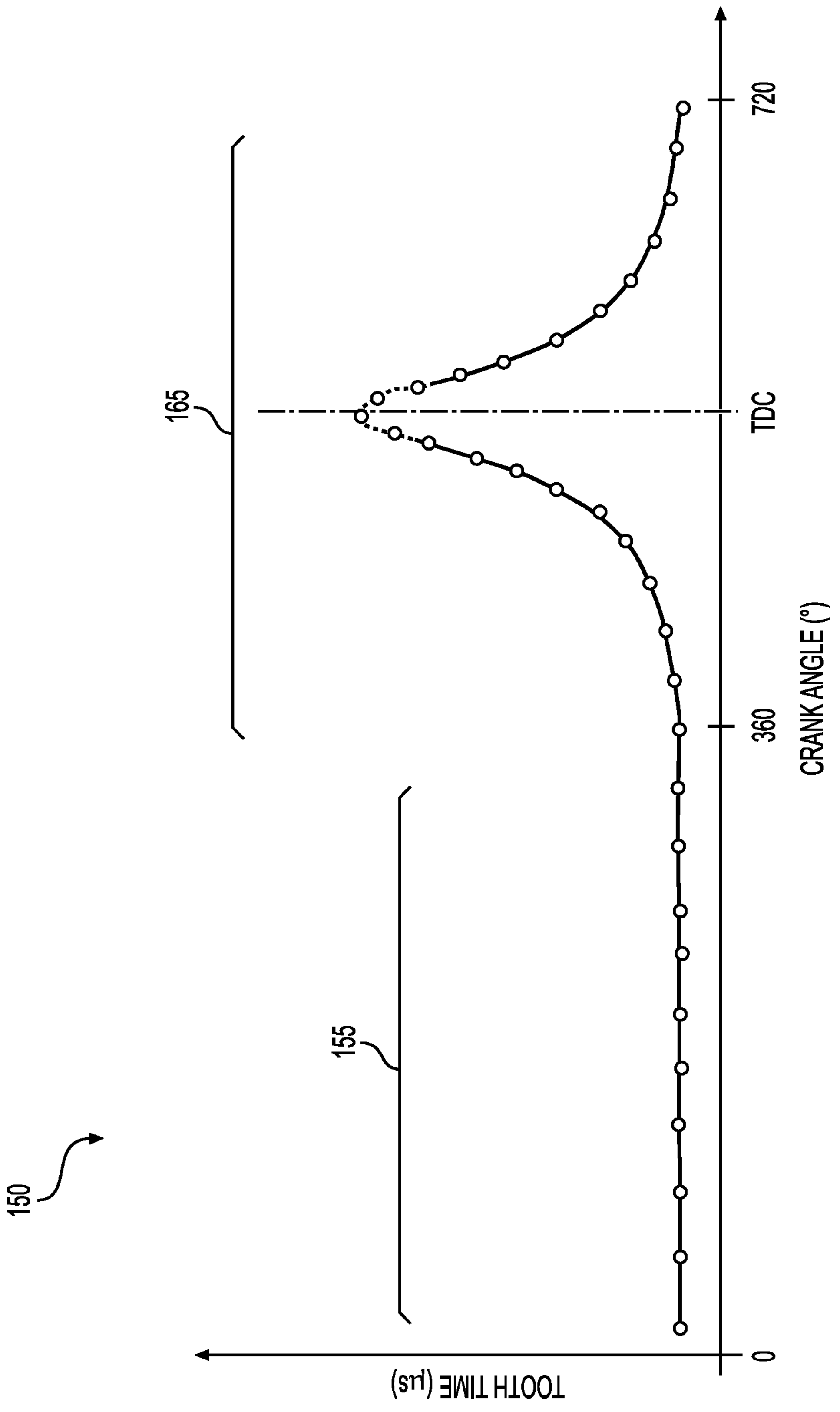
FIG. 4 is a graph illustrating an example of speed variation of a crankshaft of a one-cylinder engine during rotation by a starter motor.

For purposes of illustration, a graph 150 illustrating the variation in crankshaft speed (as represented by tooth time) for the simplified case of a one-cylinder four-stroke engine is presented in FIG. 4. The example crankshaft is rotating through an air exchange phase 155 in the first 360 degrees represented. The rotational speed of the crankshaft is thus fairly constant, as is illustrated by the fairly constant tooth time. In the second 360 degrees presented, the crankshaft is rotating through an ignition phase 165. The crankshaft thus slows (increasing tooth time) as the piston approaches a top dead center (TDC) position in the compression stroke and subsequently speeds up (decreasing tooth time) as the piston moves past TDC in the expansion stroke. An example graph 180 illustrating the variation in crankshaft speed (as represented by tooth time) for the illustrated three-cylinder engine 50 is presented in FIG. 5. Two models of speed variation for the crankshaft 22 are presented, each having a different load. As can be seen in the Figure, overall amplitude of the increases and decreases in rotational speed of the crankshaft 22 could vary depending on the particular operational details, but the angular position of the speed variations is generally consistent.

Rather than monitoring the rotational speed of the crankshaft 22 at all moments to find a variation in speed, one or measurement windows are chosen. As used herein, the measurement window refers to a selected angular portion of the rotation of the crankshaft to be used for measuring speed variation of the crankshaft 22.

The measurement window is selected at an angular position of the crankshaft 22 in which a speed variation is expected. For example, the measurement window for the engine 50 could be chosen at 160 degrees, which is the TDC position of one of the pistons 16 (see FIG. 5). Selection of a discrete window, rather than monitoring the speed at all times, further allows for a simpler determination to be made: when the speed variation is found, this indicates that the crankshaft 22 is in the ignition phase of the working cycle for one of the cylinders 12. For a measurement window around 160 degrees, for example, a speed variation should be found when the crankshaft 22 is in the first 360 degrees of the a priori known working cycle. When the crankshaft 22 is in the second 360 degrees (360-720 degrees in FIG. 5), there should be no speed variation detected at 160 degrees angular position of the crankshaft 22 (520 degrees of the 720 degree cycle).

Having determined one or more engine speed variations, the method 100 then continues, at step 130, with identifying the working cycle phase of the crankshaft 22. In response to an absolute value of the engine speed variation being above a threshold, the method 100 includes determining that the crankshaft 22 is in the ignition revolution (the ignition phase) of the working cycle of the engine 50 within the measurement window. The threshold speed variation is chosen to minimize false positive identifications of speed variations due to other sources. The particular threshold chosen depends on different implementational details, including, for example, attributes of the engine 50.

Figure 5:
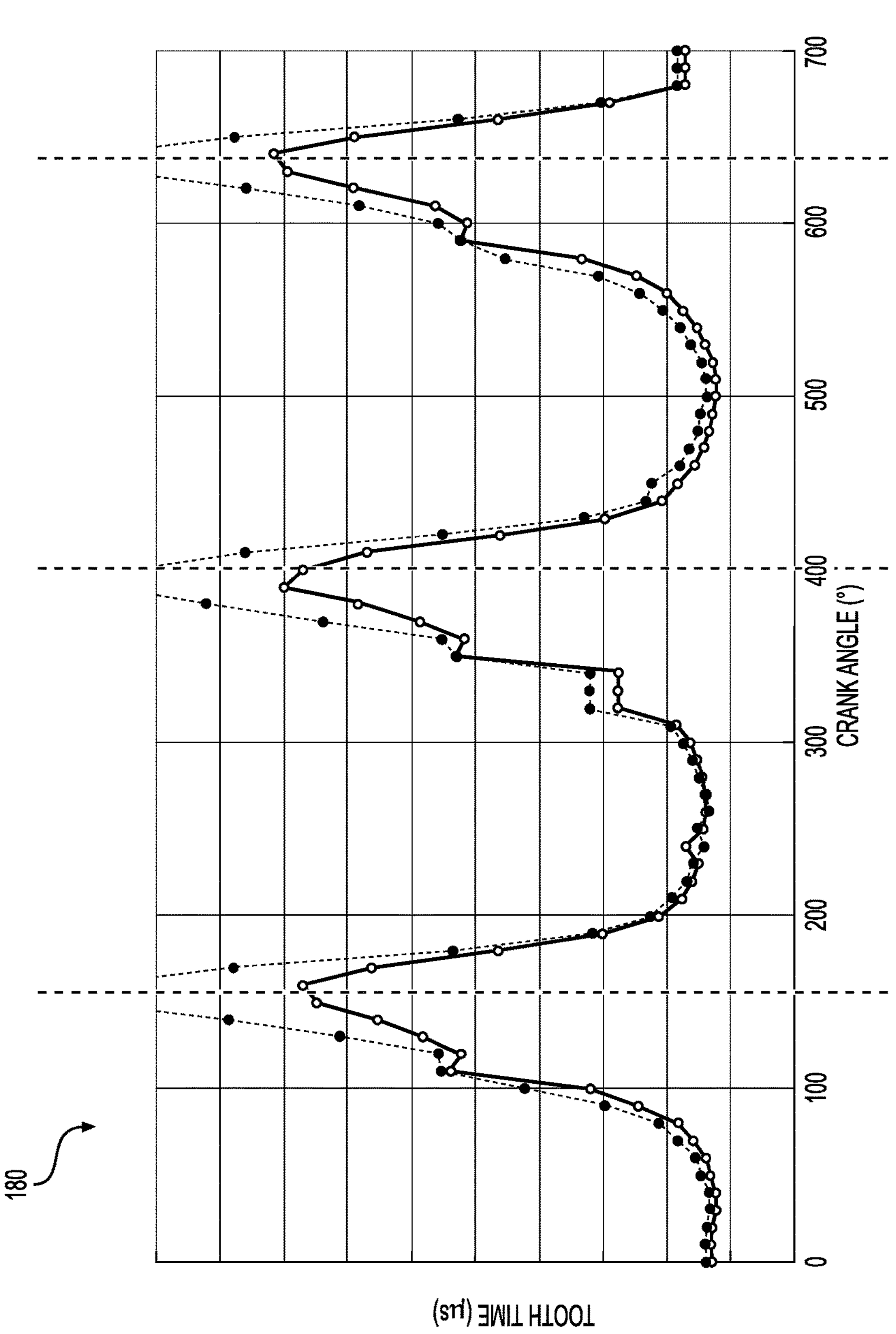
FIG. 5 is a graph illustrating an example of speed variation of the crankshaft of the engine of FIG. 1 during rotation by a starter motor.

It is noted that in multiple cylinder engines, such as the three-cylinder engine 50, there could be ignition TDC positions in both of the two revolutions of the working cycle, as is illustrated in FIG. 5. In such a case, a measurement window is selected around the angular position of the crankshaft 22 corresponding to the TDC position during the ignition phase for a particular piston 16. Detection of a rotational speed variation within the measurement window thus indicates that the crankshaft 22 is in the ignition phase for the chosen piston 16, even if one or more of the remaining pistons 16 may have their compression and expansion strokes in the other phase of the working cycle. In some implementations, the method 100 could include identifying one or more measurement windows based, at least in part, on determination of the angular orientation of the crankshaft 22. Depending on the particular engine, it is noted that the measurement window could be selected based on calibrated speed graphs of that particular engine, rather than around a particular angular position corresponding to one of the TDC positions.

As is noted above, subsequent ignition of the engine 50 is then based on determination of the angular orientation and identification of the working cycle phase of the crankshaft 22.

In at least some implementations, determining the engine speed variations includes determining one or more rotational speed indications of the crankshaft 22 as the crankshaft 22 rotates through a first portion of the measurement window and one or more rotational speed indication as the crankshaft 22 rotates through a second portion of the measurement window, the speed indications being produced by the crankshaft sensor 80. In at least some embodiments, the speed indications include time stamp information. The method 100 could then include calculating a difference of the rotation speed indications in the two portions of the measurement window. In some such implementations, the two portions of the measurement window could be disposed on opposite sides of a TDC position. In this case, the speed variations (as represented by tooth time) have different signs (increasing tooth time in one portion and decreasing tooth time in the other portion) when in the ignition phase. Calculating a difference between the speed variations in the two portions thus has a greater absolute value. In contrast, when in the air exhaust phase, any detected speed variation should be approximately equal, and the calculated difference therebetween should minimize the speed variation value.

As is noted above, in present implementations, rotational speed variations of the crankshaft 22 are determined by measuring a tooth time for the teeth 87 arriving at the crankshaft sensor 80. In at least some embodiments, determining or measuring the tooth time could be based at least in part on time stamp information of the speed indications. The method 100 thus includes in some implementations sensing passage of a given tooth 87 (*n*) through the crankshaft sensor 87, sensing passage of a subsequent tooth (n+1) disposed immediately adjacent to the given tooth (n) through the crankshaft sensor 80, and determining a corresponding tooth time ($t_n$) between passage of the given tooth (n) and passage of the subsequent tooth (n+1). Determining another rotational speed indication, for example at a different point in the measurement window, thus includes sensing passage of another given tooth (m) and passage of another subsequent tooth (m+1) through the crankshaft sensor 80, and determining another tooth time ($t_m$) between passage of the given tooth (m) and passage of the subsequent tooth (m+1).

The method 100 could then include determining if a difference of the tooth time ($t_n$) of the first portion of the measurement window and the tooth time ($t_m$) of the second portion of the measurement window is above the threshold. In at least some implementations, the method 100 could further include determining if a plurality of pairs of teeth 87, each of the pair being chosen from different portions of the measurement window, have a difference in tooth time greater than the threshold. For example, the difference for each pair ($t_n - t_m$), ($t_{n+1} - t_{m+1}$), ($t_{n+2} - t_{m+2}$), and so on could be compared to the threshold. In at least some implementations, identification of the phase of the working cycle could be based on at least some of the differences in tooth time being above the threshold.

In at least some implementations, determining the tooth times to detect a rotational speed variation could include selecting a first given tooth (n) and a first subsequent tooth (n+1) as the crankshaft 22 approaches a selected angular position in the measurement window, and selecting a second given tooth (m) and a second subsequent tooth (m+1) as the crankshaft 22 rotates away from the selected angular position. In at least some implementations, the selected angular position could be the TDC of the ignition cycle of one of the pistons 16.

In at least some implementations, the method 100 could further include causing ignition in one or more cylinders 12 of the engine 50 during subsequent rotations of the crankshaft 22. As is described above, timing of the causing the ignition is based on determination of the angular orientation of the crankshaft 22 and determination of the revolution or phase of the working cycle that the crankshaft is in. In some implementations, the method 100 could further include causing fuel injection in one or more cylinders 12 of the engine 50 during subsequent rotations of the crankshaft 22.

In some implementations, the method 100 could further include retrieving an angular range of the crankshaft 22 describing the measurement window. In some cases, the angular range of the measurement window could be stored to a memory device coupled to the ECU 70. In at least some implementations, the angular range could be based at least in part on an expected top dead center position for one of the pistons 16 operatively connected to the crankshaft 22. As is noted above, the maximum in rotational speed variation of the crankshaft 22 should occur around the TDC position. Selecting a measurement window around the TDC position should thus increase reliability of the measurement.

In some cases, during a first operation of the method 100, there may be little or no speed variation detected, i.e. the speed variation is below the above-mentioned threshold. It is also contemplated that the method 100 could further include determining that the speed variation is below a pre-determined lower threshold. In some implementations, the method 100 could correspondingly identify that the crankshaft 22 is in the air exchange phase based on the speed variation is below the pre-determined lower threshold.

As different applications of the method 100 could include various sources of noise in the speed measurements, the method 100 could generally include determining speed variations over multiple rotations of the crankshaft 22 in order to positively identify the ignition phase revolution of the crankshaft 22.

For example, in some implementations of the method 100, identifying the working cycle phase could further include, in response to an absolute value of the speed variation being below the threshold, determining, after the crankshaft 22 has rotated 360 degrees, at least one additional speed variation as the crankshaft 22 rotates through the measurement window. In response to the additional speed variation being above the threshold, the method 100 could then determine that the crankshaft 22 is in the ignition revolution of the two revolution working cycle.

In some implementations of the method 100, one or more additional or alternative measurement windows could be identified and/or used. For example, if after multiple measurements no positive determination of the ignition phase can be made, a different measurement window could be used. Some implementations of the method 100 could thus include determining yet another speed variation as the crankshaft 22 rotates through the alternative measurement window. In response to an absolute value of the speed variation being above the threshold, the method 100 could then include determining that the crankshaft 22 is in the ignition revolution.

It is contemplated that the method 100 could include additional or different steps, either to perform additional functions and/or to perform the steps described above. Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for managing start up of a four-stroke engine, the method being performed by a controller communicatively connected to the engine, the method comprising:

determining, using a crankshaft sensor communicatively connected to the controller, an angular orientation of the crankshaft, the crankshaft being rotated by a starter motor operatively connected to the crankshaft prior to ignition of the engine;

determining, using the crankshaft sensor, at least one engine speed variation as the crankshaft rotates through at least one measurement window, determining the at least one engine speed variation including:

determining at least one first rotational speed indication of the crankshaft as the crankshaft rotates through a first portion of the at least one measurement window by:

sensing, by the crankshaft sensor, passage of a first given tooth (n) through the crankshaft sensor, the first given tooth (n) being one of a plurality of regularly spaced teeth of a gear connected to and rotationally fixed on the crankshaft, sensing, by the crankshaft sensor, passage of a first subsequent tooth (n+1) disposed immediately adjacent to the first given tooth (n) through the crankshaft sensor, and determining a first tooth time between passage of the first given tooth (n) and passage of the first subsequent tooth (n+1);

determining at least one second rotational speed indication of the crankshaft as the crankshaft rotates through a second portion of the at least one measurement window, by:

sensing, by the crankshaft sensor, passage of a second given tooth (m) through the crankshaft sensor, sensing, by the crankshaft sensor, passage of a second subsequent tooth (m+1) disposed immediately adjacent to the second given tooth (m) through the crankshaft sensor, and determining a second tooth time between passage of the second given tooth (m) and passage of the second subsequent tooth (m+1); and calculating a difference of the at least one first rotation speed indication and the at least one second rotational speed indication; and identifying a working cycle phase of the crankshaft comprising:

in response to an absolute value of the at least one engine speed variation being above a threshold, determining that the crankshaft is in an ignition revolution of a two revolution working cycle of the engine in the at least one measurement window, subsequent ignition of the engine being based on determination of the angular orientation of the crankshaft and identification of the working cycle phase of the crankshaft.

2. The method of claim 1, wherein determining the angular orientation of the crankshaft comprises:

detecting, using the crankshaft sensor, a tooth gap in a plurality of regularly spaced teeth of a gear connected to and rotationally fixed on the crankshaft; and identifying the angular orientation based on a priori knowledge of placement of the tooth gap relative to the angular orientation of the crankshaft.

3. The method of claim 1, wherein:

determining the first tooth time comprises selecting the first given tooth (n) and the first subsequent tooth (n+1) as the crankshaft approaches a selected angular position in the first portion of the at least one measurement window; and determining the second tooth time comprises selecting the second given tooth (m) and the second subsequent tooth (m+1) as the crankshaft rotates away from the selected angular position in the second portion of the at least one measurement window.

4. The method of claim 1, further comprising determining a stroke prior to a first ignition and causing ignition in at least one cylinder of the engine during subsequent rotations of the crankshaft; and wherein timing of the causing the ignition is based on:

determination of the angular orientation of the crankshaft, and determination that the crankshaft is in one of the first revolution and the second revolution.

5. The method of claim 1, further comprising, prior to determining the angular orientation of the crankshaft, causing the starter motor to rotate of the crankshaft.

6. The method of claim 1, wherein determining the at least one engine speed variation includes identifying the at least one measurement window based at least in part on determination of the angular orientation of the crankshaft.

7. The method of claim 1, further comprising, prior to determining the at least one engine speed variation, retrieving an angular range of the crankshaft describing the at least one measurement window, the angular range being based at least in part on an expected top dead center position for at least one piston operatively connected to the crankshaft.

8. The method of claim 1, wherein:

the at least one engine speed variation is at least one first speed variation; and identifying the working cycle phase further comprises, in response to an absolute value of the at least one first speed variation being below the threshold:

determining, after the crankshaft has rotated 360 degrees, at least one second speed variation as the crankshaft rotates through the at least one measurement window, the at least one measurement window being less than 180 degrees, and in response to the at least one second speed variation being above the threshold, determining that the crankshaft is in the ignition revolution of the two revolution working cycle.

9. The method of claim 8, wherein:

the at least one measurement window is a first measurement window; and identifying the working cycle phase further comprises, in response to an absolute value of the at least one second speed variation being below the threshold:

determining at least one third speed variation as the crankshaft rotates through a second measurement window, and in response to an absolute value of the at least one third speed variation being above the threshold, determining that the crankshaft is in the ignition revolution of the two revolution working cycle.

10. The method of claim 1, wherein:

the threshold is a first threshold; and the method further comprises:

in response to an absolute value of the at least one engine speed variation being below a second threshold, determining that the crankshaft is in an air exchange revolution of the two revolution working cycle of the engine in the at least one measurement window.

* * * * *